US009915559B2

(12) United States Patent
Radcliff (10) Patent No.: US 9,915,559 B2
(45) Date of Patent: Mar. 13, 2018

(54) SYSTEMS AND METHODS FOR WIRELESSLY MONITORING A BROCHURE BOX

(76) Inventor: Jaime Radcliff, Des Moines, WA (US)

( * ) Notice: Subject to any disclaimer, the term of this patent is extended or adjusted under 35 U.S.C. 154(b) by 540 days.

(21) Appl. No.: 12/359,796

(22) Filed: Jan. 26, 2009

(65) Prior Publication Data

US 2009/0192764 A1    Jul. 30, 2009

Related U.S. Application Data

(60) Provisional application No. 61/023,806, filed on Jan. 25, 2008, provisional application No. 61/036,610, filed on Mar. 14, 2008, provisional application No. 61/045,053, filed on Apr. 15, 2008, provisional application No. 61/092,352, filed on Aug. 27, 2008.

(51) Int. Cl.
| | |
|---|---|
| *G06F 11/00* | (2006.01) |
| *G01G 23/365* | (2006.01) |
| *G05B 23/02* | (2006.01) |
| *G01G 19/52* | (2006.01) |
| *G01G 23/37* | (2006.01) |
| *G01S 5/00* | (2006.01) |

(52) U.S. Cl.
CPC .......... *G01G 23/365* (2013.01); *G01G 19/52* (2013.01); *G01G 23/3735* (2013.01); *G01G 23/3742* (2013.01); *G05B 23/02* (2013.01); *G01S 5/0027* (2013.01)

(58) Field of Classification Search
CPC .. G05B 23/02; G01G 23/365; G01G 23/3728; H05B 37/0245; H05B 37/0272; G01B 11/0625; G01B 15/02
USPC ........................................................ 702/188
See application file for complete search history.

(56) References Cited

U.S. PATENT DOCUMENTS

| | | | | |
|---|---|---|---|---|
| 3,463,309 | A | | 8/1969 | Szostek |
| 3,767,110 | A | | 10/1973 | Congleton |
| 3,986,322 | A | * | 10/1976 | Taylor ............................. 53/571 |
| 4,005,776 | A | | 2/1977 | Seeley |
| 4,218,145 | A | * | 8/1980 | Brock et al. .................... 366/18 |

(Continued)

FOREIGN PATENT DOCUMENTS

| | | | |
|---|---|---|---|
| CA | 2304443 | | 10/2001 |
| JP | 59-159021 | * | 9/1984 |
| WO | WO 2007/018233 | * | 2/2007 |

OTHER PUBLICATIONS

English Abstract of JP 59-159021, Sep. 8, 1984.*
www.brightflyer.com, Jan. 26, 2009.

*Primary Examiner* — Michael Nghiem
(74) *Attorney, Agent, or Firm* — Peloquin, PLLC; Mark S. Peloquin, Esq.

(57) ABSTRACT

This invention relates generally to electronics, mechanics, and software, and more specifically, to systems and methods for wirelessly monitoring a brochure box. In one embodiment, the invention includes an apparatus that provides for remote content monitoring, the apparatus including a receptacle, the receptacle configurable to storing content; and a sensor node, the sensor node disposed proximate to the receptacle, the sensor node associated with a unique identifier, the sensor node configurable to monitor the existence of any stored content, the sensor node configurable to transmit a signal containing the unique identifier to a remote device, the signal being any of a cellular, satellite, and wireless network signal.

17 Claims, 6 Drawing Sheets

(56) References Cited

U.S. PATENT DOCUMENTS

| | | | |
|---|---|---|---|
| 4,459,673 A * | 7/1984 | Shibazaki et al. | 704/274 |
| 4,807,806 A | 2/1989 | Nieman | |
| 4,884,718 A | 12/1989 | Leahy | |
| 4,930,627 A | 6/1990 | Borst | |
| 4,982,176 A * | 1/1991 | Schwarz | 340/567 |
| 4,986,438 A | 1/1991 | Borst | |
| 5,012,927 A | 5/1991 | Borst | |
| 5,038,936 A | 8/1991 | Borst | |
| 5,090,568 A | 2/1992 | Tse | |
| 5,147,035 A | 9/1992 | Hartman | |
| 5,209,354 A | 5/1993 | Thornhill | |
| 5,267,643 A | 12/1993 | Scribner | |
| 5,595,300 A | 1/1997 | Paik | |
| 6,624,742 B1 | 9/2003 | Romano | |
| 7,147,161 B2 * | 12/2006 | He | G06K 7/14 235/462.16 |
| 7,187,936 B2 * | 3/2007 | Allyn | G08B 13/1427 340/568.1 |
| 7,292,875 B2 * | 11/2007 | Chan | H04M 1/0245 361/679.27 |
| 7,389,603 B1 | 6/2008 | Brumfield | |
| 2002/0088157 A1 | 7/2002 | Winterton | |
| 2004/0049406 A1 | 3/2004 | Muncaster | |
| 2004/0066275 A1 * | 4/2004 | Mickler | F41C 33/06 340/5.33 |
| 2005/0037815 A1 * | 2/2005 | Besharat | G09G 5/02 455/566 |
| 2005/0066567 A1 * | 3/2005 | Newkirk | F41A 17/06 42/70.11 |
| 2005/0073406 A1 * | 4/2005 | Easley et al. | 340/539.1 |
| 2006/0101690 A1 | 5/2006 | Terbert | |
| 2006/0117625 A1 | 6/2006 | Peterson | |
| 2006/0200285 A1 * | 9/2006 | Obradovich | 701/30 |
| 2007/0261280 A1 | 11/2007 | Rastegar | |
| 2007/0281758 A1 * | 12/2007 | Ara | G01D 5/00 455/574 |
| 2008/0016736 A1 | 1/2008 | Tollis | |
| 2008/0189185 A1 * | 8/2008 | Matsuo | G06Q 20/202 705/21 |
| 2008/0204231 A1 * | 8/2008 | Hietanen | F41A 17/063 340/568.1 |
| 2013/0035901 A1 * | 2/2013 | Breed | 702/188 |

\* cited by examiner

SYSTEMS AND METHODS FOR WIRELESSLY MONITORING A BROCHURE BOX

PRIORITY CLAIM

This application claims the benefit of U.S. provisional patent application Ser. No. 61/023,806 filed Jan. 25, 2008; U.S. provisional patent application Ser. No. 61/036,610 filed Mar. 14, 2008; U.S. provisional patent application Ser. No. 61/045,053 filed Apr. 15, 2008 and U.S. provisional patent application Ser. No. 61/092,352 filed Aug. 27, 2008. The foregoing applications are incorporated by reference in their entirety as if fully set forth herein.

FIELD OF THE INVENTION

This invention relates generally to electronics, mechanics, and software, and more specifically, to systems and methods for wirelessly monitoring a brochure box.

BACKGROUND

Real estate agents and brokers commonly use a brochure box to dispense brochures having information and pictures relating to a home for sale. The brochure box is usually fastened to a sign that is proximate to the home and conveniently accessible to interested individuals. Brochures are manually supplied to the brochure box and individuals are able to access and review the brochures and the information contained thereon. Due to the general popularity of brochures, it is not uncommon for individuals to quickly empty the brochure box. Accordingly, the real estate agent or broker must resupply the brochures when they are exhausted. However, providing the additional supply of brochures is often not performed expeditiously, thereby resulting in frustration to the home seller and even missed sales opportunities.

The primary impediment to promptly refilling the brochure box is lack of knowledge as to when the brochures are depleted. Currently, the only way to know when additional brochures are needed is through a visual inspection of the brochure box. Because the real estate agent or broker works remotely and only sporadically visits the home, expedient visual inspections are not always possible. Thus, when the brochure box is emptied, it usually remains that way until the next visit from the real estate agent.

There have been significant advances in the field of sensors and wireless technology. For example, inexpensive sensors are currently available to capture data on illumination, displacement, position, temperature, humidity, and barometric pressure. Sensor examples include Besharat (U.S. Pat. Pub. 2005/0037815) and Chan (U.S. Pat. No. 7,292,875). Once obtained, this information can be instantly processed and wirelessly communicated to a remote location. Wireless communication examples include Ara (U.S. Patent Pub. 2007/0281758); Nakajima (U.S. Pat. No. 7,147,161); and Allyn (U.S. Pat. No. 7,187,936). Although sensors and wireless technology are widely available, they have not yet been utilized to address the aforementioned problems relating to empty brochure boxes.

Accordingly, although desirable results have been achieved, there exists much room for improvement. What is needed then are systems and methods for systems and methods for wirelessly monitoring a brochure box.

SUMMARY

This invention relates generally to electronics, mechanics, and software, and more specifically, to systems and methods for wirelessly monitoring a brochure box. In one embodiment, the invention includes an apparatus that provides for remote content monitoring, the apparatus including a receptacle, the receptacle configurable to storing content; and a sensor node, the sensor node disposed proximate to the receptacle, the sensor node associated with a unique identifier, the sensor node configurable to monitor the existence of any stored content, the sensor node configurable to transmit a signal containing the unique identifier to a remote device, the signal being any of a cellular, satellite, and wireless network signal. In a further embodiment, the apparatus further includes an infrared light source, the infrared light source being disposed proximate to the sensor node, the infrared light source being configurable to transmit infrared light upon the sensor node, wherein the sensor node includes an optical sensor, the optical sensor configurable to sensing the infrared light from the infrared light source. In one particular embodiment, the receptacle is a brochure box and the stored content is a brochure, wherein the stored brochure blocks the infrared light from being sensed by the optical sensor, wherein removal of the stored brochure results in the infrared light being sensed by the optical sensor, and wherein the sensor node is configurable to transmit a signal containing the unique identifier to the remote device upon the optical sensor sensing the infrared light.

BRIEF DESCRIPTION OF THE DRAWINGS

Embodiments of the present invention are described in detail below with reference to the following drawings.

APPENDIX A includes manufacturing details for a system for wirelessly monitoring a brochure box having a sensor, in accordance with an embodiment of the invention.

DETAILED DESCRIPTION

This invention relates generally to electronics, mechanics, and software, and more specifically, to systems and methods for wirelessly monitoring a brochure box. Specific details of certain embodiments of the invention are set forth in the following description and in FIGS. 1-6 and APPENDIX A to provide a thorough understanding of such embodiments. The present invention may have additional embodiments, may be practiced without one or more of the details described for any particular described embodiment, or may have any detail described for one particular embodiment practiced with any other detail described for another embodiment.

Figure 1:
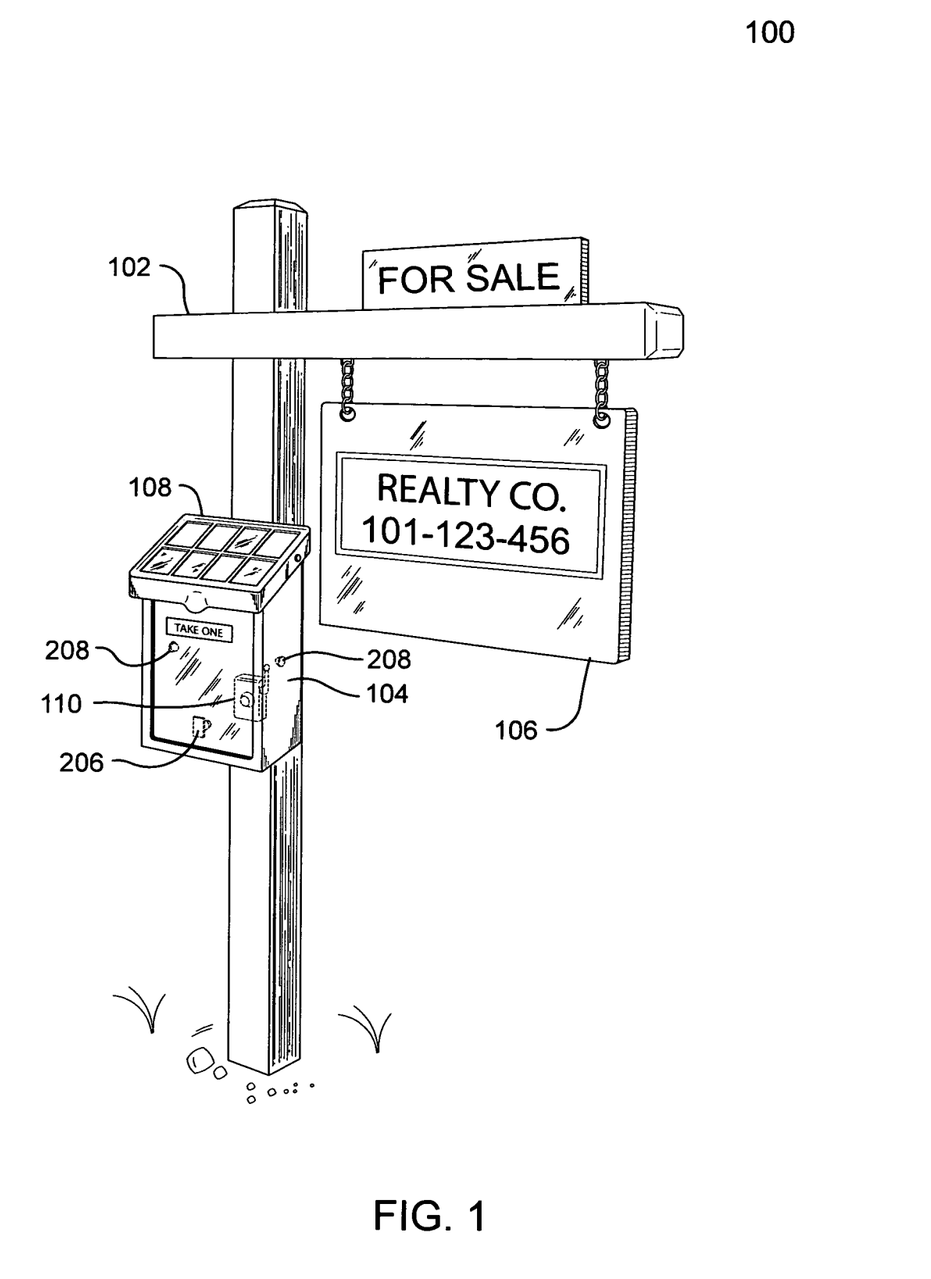
FIG. 1 is a perspective view of a brochure box having a sensor fastened to a sign holder, in accordance with an embodiment of the invention.

FIG. 1 is a perspective view of a brochure box having a sensor fastened to a sign holder, in accordance with an embodiment of the invention. In one embodiment, system 100 includes a sign holder 102, a brochure box 104, a sign 106, a lid 108, and a sensor node 110. The sign holder 102 suspends the sign 106 for display. The brochure box 104 is configurable to receive and dispense brochures (FIG. 4a) and is fastened to the sign holder 102. The brochure box 104 includes the sensor node 110 and the lid 108, which is configurable to open and close to facilitate receiving and dispensing brochures. The sensor node 110 is operable to sense whether there is a presence or absence of brochures and communicate such information to an entity, such as an individual, group, organization, or business, tasked with replenishing the brochures (FIG. 5). Accordingly, system 100 is usable in a real estate sales environment whereby the sign holder 102 is disposed proximate to a home for sale and the sign 106 is a 'for sale' sign. The brochure box 104 is configurable to receive and dispense brochures providing information and pictures relating to the home for sale. The sensor node 110 determines when the brochures within the brochure box 104 are low or exhausted and communicates such to an entity tasked with replenishing the brochures, such as a real estate agent or broker.

In various other embodiments, the sign holder 102 or the sign 106 are omitted and only the brochure box 104 is provided. Alternatively, the brochure box 104 can be mounted differently, such as on a support stand, to a post, or to a building. Further, the brochure box 104 and the sign holder 102 can be integrated into a single component. Additionally, the brochure box 104 or the sign holder 102 can be constructed from plastic, wood, concrete, or some other material. In an alternate embodiment, the sensor node 110 is disposed differently relative to the brochure box 104 or on the sign holder 102. In further embodiments, system 100 is usable in different environments such as within educational institutions, on message boards, in business lobbies, or anywhere else where brochures are dispensed. In alternative embodiments, the brochure box 104 is a mail box, a post office box, a drop box, vending machine, or any other receptacle whereby documents, mail, packages, or other objects are deposited for pickup. In these embodiments, the sensor node 110 is operable to sense the presence of documents, mail, packages, or other objects and communicate such information to an entity tasked with retrieving the same (FIG. 5). Thus, the brochure box 104 in these embodiments is configurable to receive documents, mail, packages, or other objects and the sensor node 110 is configurable to determine when documents, mail, packages, or other objects are present to communicate such to an entity having an interest in retrieving the documents, mail, packages, or other objects. In other embodiments, the sensor node 110 is replaced or supplemented with an input device such as a mechanical or electrical button, switch, motion sensor, or other similar device. The input device is positionable proximate to or within the brochure box 104. Thus, upon brochures being low or exhausted or upon documents, mail, packages, or other objects being present, the input device is triggered, such as by pushing the button, flipping the switch, or through motion, to communicate such to an entity having an interest in replenishing or retrieving the same.

In one particular embodiment, the brochure box 104 includes a locking mechanism.

Figure 2:
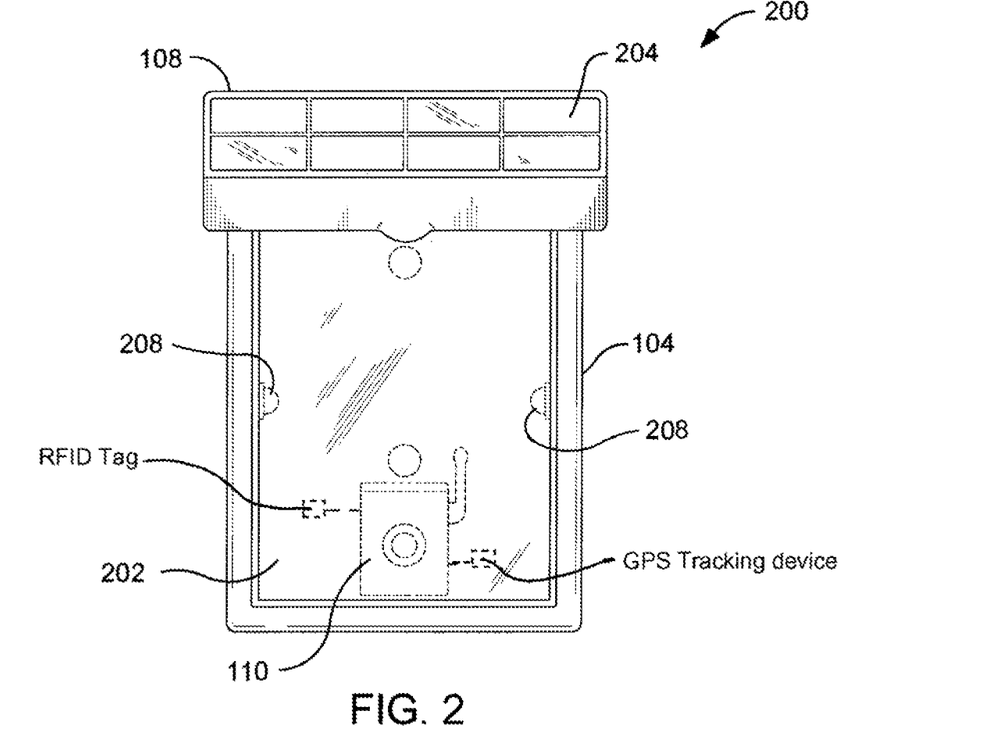
FIG. 2 is a front elevational view of a brochure box having a sensor, in accordance with an embodiment of the invention.

FIG. 2 is a front elevational view of a brochure box having a sensor, in accordance with an embodiment of the invention. In one embodiment, system 200 includes the brochure box 104, the lid 108, the sensor node 110, front panel 202, and solar panels 204, and an infrared light source 206. The brochure box 104 defines a cavity for receiving and dispensing brochures (FIG. 4). The front panel 202 is at least partially transparent to permit viewing of any brochures disposed within the brochure box 104. The lid 108 removably covers the brochure box 104 to protect brochures contained therein and contains the solar panels 204. The brochure box 104 is composed of plastic, aluminum, steel, concrete or a combination of the foregoing. The sensor node 110 is fastened to the brochure box 104 opposite to the front panel 202 and includes an optical sensor for sensing infrared light, a processor, a wireless communication modem, and a power source. The infrared light source 206 is disposed opposite to the sensor node 110 and is configurable to transmit infrared light towards the optical sensor. In certain embodiments, the infrared light source 206 conserves energy by only periodically transmitting infrared light and the sensor node 110 conserves energy by only periodically sampling for infrared light. The transmission and sampling can be synchronized. When brochures are present, the infrared light from the infrared light source 206 is blocked from reaching the optical sensor. However, when brochures are not present, the infrared light from the infrared light source 206 is received by the optical sensor. When the optical sensor receives the infrared light, the processor instructs the wireless communication modem to send a communication signal containing a unique identifier to a base station (FIG. 5). The wireless communication modem uses cellular, satellite, wireless LAN, or other similar technology to send the communication signal. An entity is then notifiable via text message, email, mail, phone, internet, pager, or otherwise that the sensor node 110 in the brochure box 104 corresponding to the unique identifier has sent a signal, which indicates that the brochures within the brochure box 104 are exhausted. Alternatively, the infrared light source 206 is disposed adjacent to, proximate to, or part of the sensor node 110 and is configurable to transmit infrared light away from the optical sensor. In certain embodiments, the infrared light source 206 conserves energy by only periodically transmitting infrared light and the sensor node 110 conserves energy by only periodically sampling for infrared light. The transmission and sampling can be synchronized. When brochures are present, the infrared light from the infrared light source 206 is at least partially reflected by the brochures back upon the optical sensor. However, when brochures are not present, the infrared light from the infrared light source 206 is not reflected back upon the optical sensor. Thus, when the optical sensor does not receive the infrared light, the processor instructs the wireless communication modem to send a communication signal containing a unique identifier to a base station (FIG. 5). The wireless communication modem uses cellular, satellite, wireless LAN, or other similar technology to send the communication signal. An entity is then notifiable via text message, email, mail, phone, internet, pager, or otherwise that the sensor node 110 in the brochure box 104 corresponding to the unique identifier has sent a signal, which indicates that the brochures within the brochure box 104 are exhausted. The solar panels 204 convert solar energy into electrical energy and act as the power source to the sensor node 110 or the infrared light source 206.

In alternative embodiments, the brochure box 104 and the front panel 202 are differently shaped. In another embodiment, the front panel 202 is omitted, only partially transparent, or opaque. In a further embodiment, the lid 108 is omitted or differently configured. In one particular embodiment, the brochure box 104 is a mail box, a post office box, a drop box, vending machine, or any other receptacle whereby documents, mail, packages, or other objects are deposited for pickup and the sensor node 110 is usable in coordination with the same to remotely sense the presence of documents, mail, packages, or other objects. In an alternate embodiment, the lid 108 is spring biased to a closed position over the brochure box 104. In yet another embodiment, the solar panels 204 are differently disposed, such as on the brochure box 104, on a separate extension device, or on another structure. In an additional embodiment, the sensor node 110 is differently disposed, such as on the lid 108, a side of the brochure box 104, outside the brochure box 104, on the front panel 202, or separate from the brochure box 104. In an alternate embodiment, a plurality optical sensors or infrared light sources 206 are provided for redundancy. In yet a further embodiment, the wireless communication modem is replaced or substituted with a wire-based communication modem or network card. In a further embodiment, the solar panels 204 are replaced or supplemented with one or more batteries or a wall outlet, which can act as the power source to the sensor node 110 or the infrared light source 206.

In one particular embodiment, the brochure box 104 includes one or more lights 208, such as LED lights, to illuminate the brochure box 104 and any brochures contained therein; the solar panels 204 can also act as the power source to the lights 208. In further embodiments, the brochure box 104 includes an RFID sensor to deter theft or assist in recovery. In various embodiments, the RFID sensor is coupled to the sensor node 110. The RFID sensor provides an identification for the sensor node. In an additional embodiment, the brochure box 104 includes a GPS tracking device. In various embodiments, the GPS tracking device is coupled to the sensor node 110 to sense a geographic location of the sensor node. The geographic location is transmitted to a remote device. Upon movement of the brochure box 104, such as when the brochure box is stolen, the processor is configurable to instruct the wireless communication modem to send a communication signal to a base station indicating possible theft of the brochure box 104. The GPS tracking device can continue to provide details of the location of the brochure box 104 to assist in recovering the brochure box 104. In a further embodiment, tampering with the GPS tracking device renders the sensor node 110 inoperable. In yet another embodiment, the brochure box 104 includes a voice system that provides audible messages in response to the presence of individuals or the removal of a brochure from the brochure box 104. Such audible messages can include "welcome", "please take a brochure", "thank you for taking a flier", details from the brochure or about a house for sale, or other similar or customized messages. In various embodiments, the voice system is disposed proximate to the receptacle.

In an alternative embodiment, the sensor node 110 is configurable to sample any of ambient light, other light, displacement, pressure, heat, movement, impression, position, weight, density, mass, magnetic flux, other attribute, or a combination of the same. For instance, in one particular embodiment, the sensor node 110 is configurable to sample ambient light levels in the brochure box 104 and the processor compares the sampled ambient light levels with a predetermined threshold value or range of values. When the sampled ambient light levels are greater than the predetermined threshold value or outside a range of values, such as would occur when the brochure box 104 contains no brochures, the processor instructs the wireless communication modem to send a communication signal containing a unique identifier to a base station (FIG. 5). An entity is then notifiable via text message, email, mail, phone, internet, pager, or otherwise that the sensor node 110 in the brochure box 104 corresponding to the unique identifier has sent a signal, which indicates that the brochures within the brochure box 104 are exhausted. In another particular embodiment, the sensor node 110 is configurable to sample the weight of brochures within the brochure box 104, such as using a pressure plate or pressure resistant coils. The processor compares the sampled weight values with a predetermined threshold value or range of values. When the weight is below the threshold value or outside the minimum and maximum weight distribution values, indicating the absence of brochures, the processor instructs the wireless communication modem to send a communication signal containing a unique identifier to a base station (FIG. 5). In one particular embodiment, when the weight is greater than the maximum weight distribution value, indicating too many brochures or excessive force, the processor instructs the wireless communication modem to send a communication signal to a base station indicating that there is tampering or some other problem. Similarly, the sensor node 110 can be configurable to sample displacement or position and the processor compares the sampled displacement or position value with the predetermined threshold value or the range of values. In yet a further embodiment, the sensor node 110 is supplemented or replaced by an input device such as an electronic or mechanical button, switch, audible sensor, motion sensor, or other similar device. Indeed, the sensor node 110 can include any sensor or input device.

Figure 3:
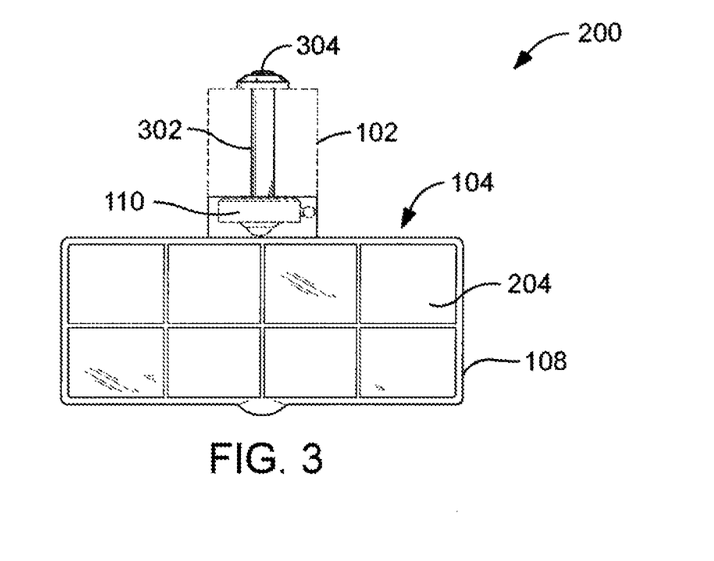
FIG. 3 is a top plan view of a brochure box having a sensor fastened to a sign holder, in accordance with an embodiment of the invention.

FIG. 3 is a top plan view of a brochure box having a sensor fastened to a sign holder, in accordance with an embodiment of the invention. In one embodiment, system 200 includes the brochure box 104, the lid 108, the solar panels 204, the sensor node 110, a post 302, a lock 304, and the sign holder 102. The lid 108 is movably mounted to the brochure box 104 to protect the brochure box 104 contents and the lid 108 includes the solar panels 204 disposed on its surface. The solar panels 204 are configurable to receive and convert solar energy from the sun into electrical energy as a power source for the sensor node 110 or the infrared light source 206. The sensor node 110 is mounted within the brochure box 110 opposite the front panel 202 (FIG. 2) and is configurable to sense infrared light from the infrared light source 206. The at least one post 302 extends approximately perpendicularly from a rear of the brochure box 104 and is configurable to being slidably received through an aperture in the sign holder 102. With the at least one post 302 inserted through the sign holder 102, the lock 304 is removably securable to the post 302 to prevent unintended removal or theft of the brochure box 104.

In another embodiment, the solar panels 204 are differently positioned relative to the brochure box 104 or the lid 108, are contained on an extension device, disposed on another structure, or are replaced or supplemented with an alternative power source. In a further embodiment, the sensor node 110 is differently mounted relative to the brochure box 110 or the lid 108; for example, the sensor node can be mounted on a side of the brochure box 110, on the front panel 202, outside the brochure box 110, on the lid 108, on an extension device, or can be disposed on another structure. In an alternative embodiment, the at least one post 302 or the lock 304 are omitted, replaced, or supplemented with an alternative structure, such as a loop, a chain, a magnet, or some other fastening device. The at least one post 302 can differently extend from the brochure box 110, such as from a side of the brochure box 110, from the front panel 202, or from the lid 108, and can differently couple to the sign holder 102, such as around the sign holder 102. Alternatively, the brochure box 104 can be integrated with the sign holder 102.

Figure 4A:
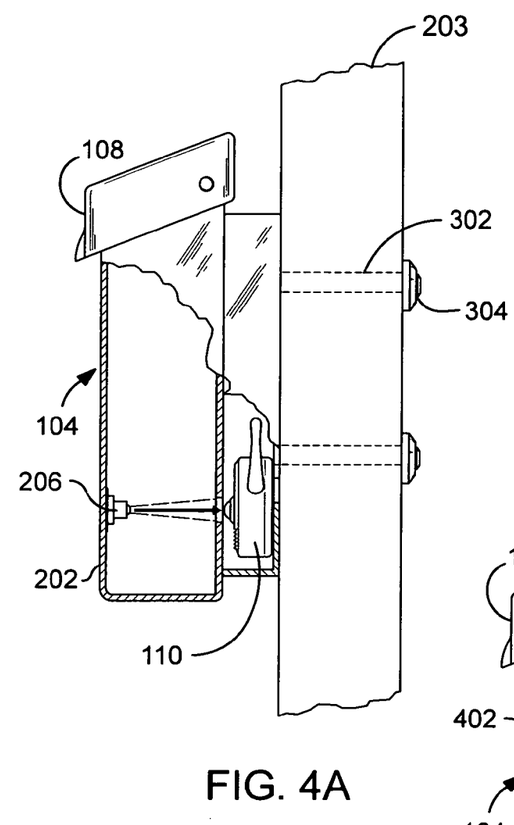
FIGS. 4a and 4b are side elevational views of a brochure box having a sensor fastened to a sign holder, in accordance with an embodiment of the invention.
Figure 4B:
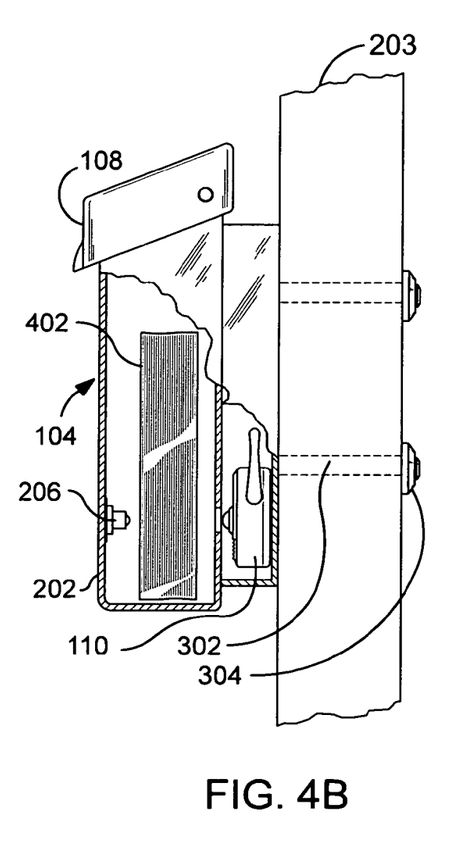
Figure 5:
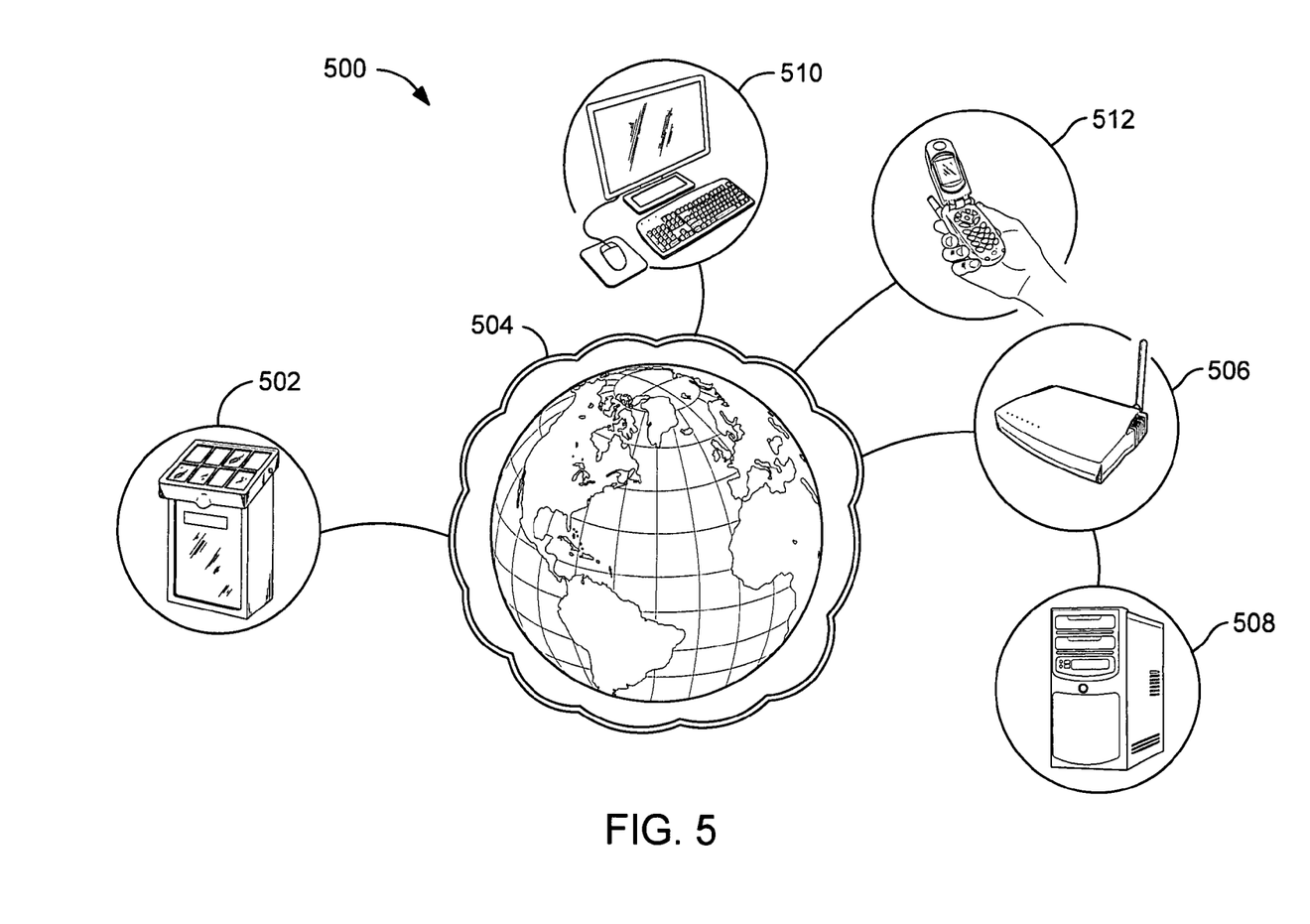
FIG. 5 is a diagram of a system for wirelessly monitoring a brochure box having a sensor, in accordance with an embodiment of the invention.

FIGS. 4a and 4b are side elevational views of a brochure box having a sensor fastened to a sign holder, in accordance with an embodiment of the invention. In one embodiment, system 200 includes the brochure box 104, the lid 108, the sensor node 110, the infrared light source 206, the at least one post 203, the lock 304, and the sign holder 102. FIG. 4a includes brochures 402 and FIG. 4b does not include brochures 402. As described more fully in reference to FIGS. 1-3 supra, the brochure box 104 includes the front panel 202, the lid 108, and the sensor node 110 and is fastened to the sign holder 102 using the at least one post 302 and the lock 304. The sensor node 110 includes an optical sensor, a processor, a wireless communication modem, and a power supply and is mounted within the brochure box 104 at a side opposite the front panel 202. The optical sensor is configurable to sense infrared light from the infrared light source 206, which is mounted opposite from the sensor node 110. When the brochure box 104 includes the brochures 402 contained therein (FIG. 4a), infrared light from the infrared light source 206 is blocked and does not reach the optical sensor. Oppositely, when the brochure box 104 is empty (FIG. 4b), infrared light from the infrared light source 206 is not blocked and reaches the optical sensor of the sensor node 110. Thus, to determine when the brochures 402 are exhausted, the infrared light source 206 transmits infrared light toward the optical sensor. When the brochures 402 are exhausted, the infrared light reaches and is sensed by the optical sensor. The processor then instructs the wireless communication modem to transmit a signal containing a unique identifier to a base station (FIG. 5). An entity is then notifiable via text message, email, mail, phone, internet, pager, or otherwise that the sensor node 110 in the brochure box 104 corresponding to the unique identifier has sent a signal, which indicates that the brochures within the brochure box 104 are exhausted. In one particular embodiment, the frequency for which the infrared light source 206 transmits infrared light or for which the optical sensor senses for infrared light is adjustable. For example, in high traffic areas the brochures 402 can be exhausted relatively quickly making increased frequencies important, whereas in low traffic rural areas the brochures 402 can be exhausted relatively slowly making decreased frequencies desirable.

In embodiments where the sensor node 110 samples ambient light levels, the threshold value or range of values can be adjustable to compensate for increased or decreased intensity of light entering the front panel 202. For example, during summer months or sunny days the sampled ambient light levels can be expected to be higher making higher threshold or range of values desirable to prevent false alarms. Oppositely, during winter months or cloudy days the sampled ambient light levels can be expected to be lower making lower threshold or range of values desirable to ensure prompt notice of exhausted brochures is provided. In one particular embodiment, a second ambient light sensor is configured to sample ambient light levels outside the brochure box 104 and the threshold or range of values are automatically adjusted accordingly. In yet a further embodiment, ambient light levels are successively sampled to prevent false alarms. For example, a first sampled ambient light level could be high despite the presence of the brochures 402 because the lid 108 was open. A subsequent sampled ambient light level would be low once the lid 108 was closed. Thus, successive sampling may reveal that the brochures 402 do not need replenishment. In yet another particular embodiment, a position or displacement sensor is used to determine whether the lid 108 is open when the sensor node 110 samples the ambient light levels.

The embodiments discussed herein are usable where the brochure box 104 is a mail box, post office box, a drop box, vending machine, or other receptacle in order to notify an entity that a document, mail, package, or other object is available for pickup. When the brochure box 104 is empty, light from the infrared light source 206 is not blocked and reaches the optical sensor of the sensor node 110. However, when the brochure box 104 contains an object, light from the infrared light source 206 is blocked and does not reach the optical sensor of the sensor node 110. Thus, to determine when an object is present within the brochure box 104, the infrared light source 206 transmits infrared light toward the optical sensor. When an object is present, the infrared light is blocked and does not reach the optical sensor. Upon the absence of infrared light, the processor then instructs the wireless communication modem to transmit a signal containing a unique identifier to a base station (FIG. 5). An entity is then notifiable via text message, email, mail, phone, internet, pager, or otherwise that the sensor node 110 in the brochure box 104 corresponding to the unique identifier has sent a signal, which indicates that an object is present within the brochure box 104 and is available for pickup.

In other embodiments, the sensor node 110 of the brochure box 104 can sense any of ambient light, other light, displacement, pressure, heat, movement, impression, position, weight, density, mass, magnetic flux, or a combination of the same or can be replaced or supplemented with an input device such as a mechanical or electrical button, switch, motion sensor, or other similar device.

FIG. 5 is a diagram of a system for wirelessly monitoring a brochure box having a sensor, in accordance with an embodiment of the invention. In one embodiment, system 500 includes a brochure box 502, a network communications cloud 504, a base station 506, an application server 508, a computer 510, and a personal digital assistant 512. As discussed further in reference to embodiments herein, the brochure box 502 includes a sensor node, which is configurable to sense infrared light, ambient light, other light, displacement, pressure, heat, movement, impression, position, weight, density, mass, magnetic flux, user input, or a combination of the same to determine whether brochures contained therein are low, exhausted, or whether objects are present. Upon a determination that the brochures need replenishment, or that documents, mail, packages, or other objects are present as the case may be, the sensor node sends a wireless signal containing a unique identifier for the brochure box 502 through the network communication cloud 504 to the base station 506, which includes a processor component and a network communication component. The network communication component receives the wireless signal containing the unique identifier and the processor component forwards the signal to the application server 508 also using the network communication component. The application server 508 hosts a software application, which is available via the network communication cloud 504 to the computer 510 or the personal digital assistant 512. An entity using the computer 510 or the personal digital assistant 512 has an account on the software application that is associated with the unique identifier. Upon receipt of the signal containing the unique identifier from the base station 506, the software application of application server 508 sends or makes available a notification to the entity having the account that is associated with the unique identifier. The notification can be sent or made available through the network communication cloud 504 to the personal digital assistant 512 or the computer 510. Accordingly, an entity is configurable to fasten the brochure box 502 to a sign holder and deposit brochures therein (FIG. 1); alternatively, the brochure box 502 may be a receptacle for an object. The unique identifier for the brochure box 502 is then associated with the entity's account in the software application of the application server 508. When the application server 508 receives a signal from the brochure box 502, the software application uses the received unique identifier to retrieve the entity's account to notify the entity through the network communication cloud 504 that the brochure box 502 needs replenishment or has an object available for pickup. Until such notice, the entity confidently assumes that the brochure box 502 contains brochures or does not have an object available for pickup. In certain embodiments, the software application of the application server 508 stores and makes available data and statistics relating to the number and rate of brochures being removed from the brochure box 502 or the number and rate of objects being disposed within the brochure box 502. In one particular embodiment, any individual or entity can supply an identifier to the software application, such as via text message, to obtain information on a home or commercial building for sale and/or receive ongoing data relating to the home or commercial building. In a further embodiment, the software application of the application server 508 is configurable to accept contact information, such as an email account, from the entity. The software application of the application server 508 then forwards a questionnaire or a link to a questionnaire using the contact information, such as to the email account. The questionnaire is then answerable with the results being available to the entity. Accordingly, a listing agent can provide the software application of the application server 508 with an email account for a buyer's agent that previewed a home. The software application of the application server 508 then forwards a questionnaire to the buyer's agent for completion with the results being available to the listing agent. The questionnaire can include questions such as (1) did you preview the home by yourself or did you bring your clients with you; (2) what did you like or dislike about the home; (3) what do you believe the home to be worth?

In certain embodiments, the unique identifier is associated with an entity's account by the entity accessing the software application of the application server 508 and establishing such association. Alternatively, the brochure box 502 is configurable to manually, electronically, or wirelessly receive an entity's account information. The brochure box 502 then forwards the received account information and the unique identifier to the software application of the application server 508 whereby the software application associates the unique identifier with the received account information for the entity. In yet another particular embodiment, the software application of the application server 508 transmits the notification through the network communication cloud 504 to the personal digital assistant 512 or the computer 510. In an alternative embodiment, the entity accesses the software application of the application server 508 to review the notification, such as by using the personal digital assistant 512, the computer 510, or via another means. In a further embodiment, the brochure box 502 sends a signal directly to an entity, such as via text message or other electronic communication, thereby directly notifying the entity that brochures are low or exhausted or that objects are present.

In yet another embodiment, the base station 506 is disposed near the brochure box 502, such as in a home that is being advertised for sale using the brochure box 502 or within a post office location; although, the base station 506 may be disposed at any location. The base station 506 is communicatably linked to the application server 508 using an internet or local area connection, such as the home or post office location's internet connection or local area connection. Accordingly, in one particular embodiment, the sensor node sends a wireless signal containing a unique identifier for the brochure box 502 to the base station 506 located in a nearby home or post office location and the base station 506 forwards the signal to the application server 508 using the home or post office location internet connection.

Figure 6:
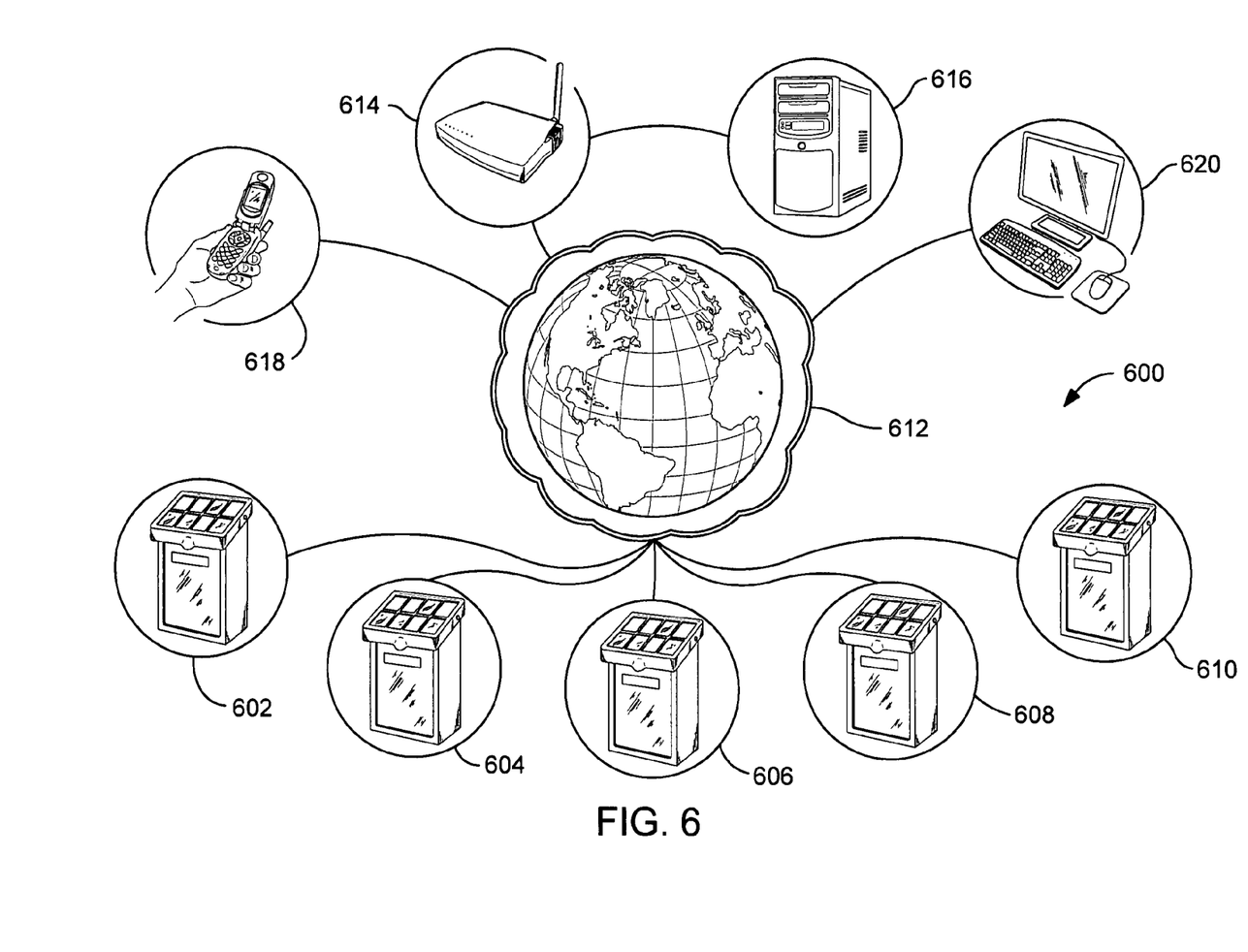
FIG. 6 is a diagram of a system for wirelessly monitoring a plurality of brochure boxes having sensors, in accordance with an embodiment of the invention.
Figure 7:
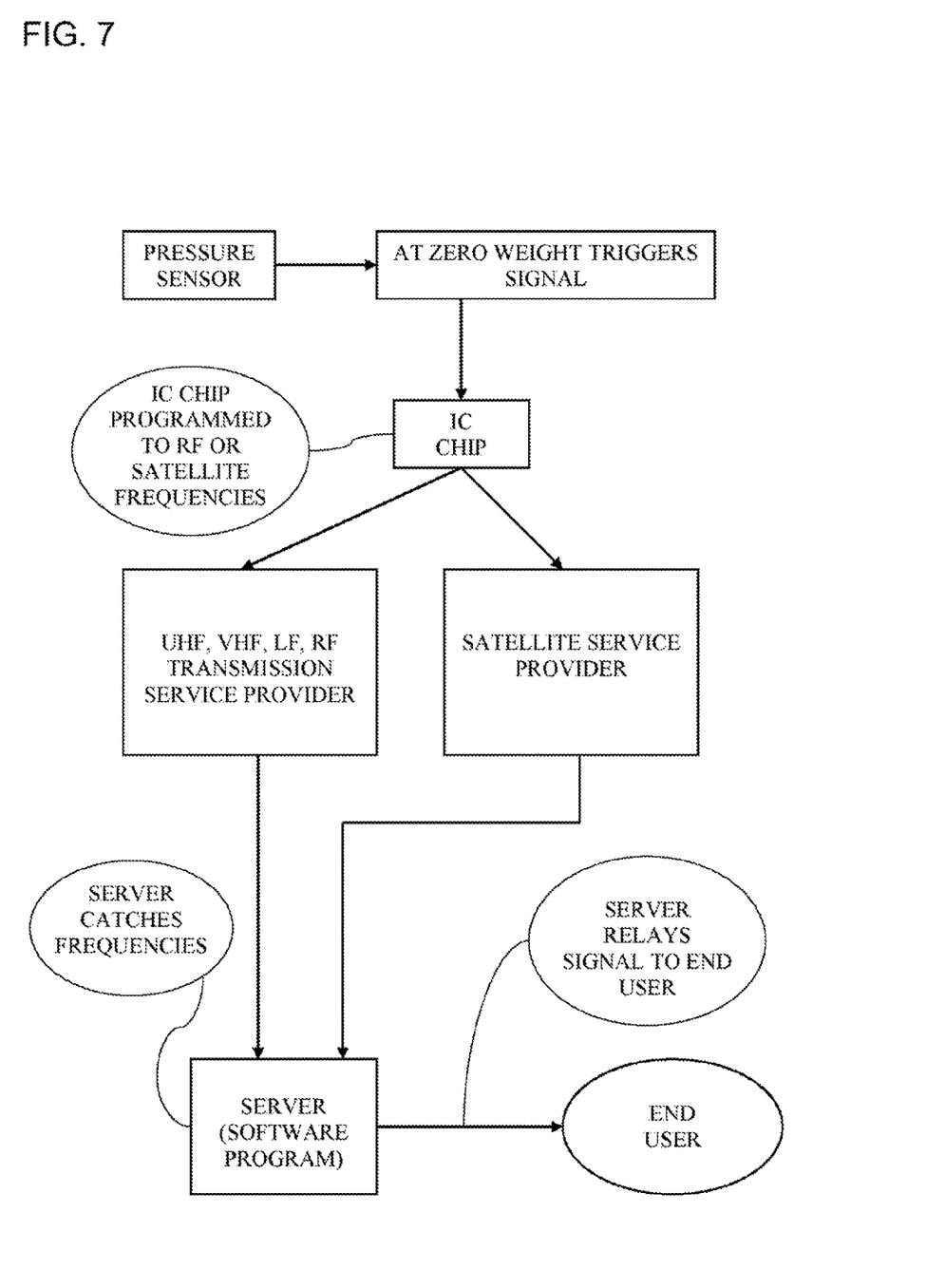
FIG. 7 illustrates use of a weight sensor, according to embodiments of the invention.

FIG. 6 is a diagram of a system for wirelessly monitoring a plurality of brochure boxes having sensors, in accordance with an embodiment of the invention. In one embodiment, system 600 includes a plurality of brochure boxes 602-610, a network communication cloud 612, a base station 614, an application server 616, a personal digital assistant 618, and a computer 620. System 600 operates as described in reference to FIG. 5 supra with the exception that system 600 includes the plurality of brochure boxes 602-610, each of which include a different unique identifier. Thus, brochures can be supplied to the brochure boxes 602-610, which are disposed in different geographic locations. The unique identifiers of the brochure boxes 602-610 are then associated with an entity's account on a software application hosted by the application server 616. Each of the brochure boxes 602-610 sense whether the brochures contained therein are low or exhausted. When one of the brochure boxes 602-610 has brochures that are low or exhausted, it sends a signal containing its unique identifier to the software application of the application server 616. The software application of the application server 616 then notifies the entity having the account associated with the unique identifier that the brochure box associated with the unique identifier needs replenishment. Accordingly, an entity is able to remotely monitor the plurality of brochure boxes 602-610 despite their different geographic locations. Additionally, when the brochure boxes 602-610 are a post office box, a mail box, a drop box, or a vending machine, the unique identifiers of the brochure boxes 602-610 can be associated with an account on a software application hosted by the application server 616. Each of the brochure boxes 602-610 sense or receive input on whether documents, mail, packages, or other objects are present. When one of the brochure boxes 602-610 has documents, mail, packages, or other objects available for pick-up, it sends a signal containing its unique identifier to the software application of the application server 616. The software application of the application server 616 obtains the account associated with the unique identifier and notifies the entity associated therewith that the brochure box associated with the unique identifier has a document, mail, package, or other objects available for pick-up. In one particular embodiment, the brochure boxes 602-610 can include a combination of brochure boxes that sense the absence or presence of brochures or objects FIG. 7 is a diagram of a system for wirelessly monitoring a brochure box having a sensor, in accordance with an embodiment of the invention. A brochure box contains a pressure or weight sensor. When the pressure or weight sensor indicates that there is zero weight or pressure, or some other threshold amount of weight or pressure, a computer chip sends an (radio frequency) RF, (low frequency) LF, (very high frequency) VHF, or (ultra high frequency) UHF or satellite signal to a service provider that indicates that brochures within the brochure box need replenishment. The transmission is received by a server and relayed to an end user. The end user can then take appropriate action to replenish the brochures within the brochure box.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An apparatus that provides for remote content monitoring, the apparatus comprising:
   a receptacle, the receptacle configurable to storing removable content; and
   a sensor node, the sensor node disposed proximate to the receptacle, the sensor node associated with a unique identifier, the sensor node configurable to monitor the existence of any stored removable content, the sensor node configurable to transmit, a signal containing the unique identifier to a remote device, wherein the signal is related to the removal of content, the signal being any of a cellular, satellite, and wireless network signal;
   an infrared light source, the infrared light source being disposed proximate to the sensor node, the infrared light source being configurable to transmit infrared light upon the sensor node, wherein the sensor node includes an optical sensor, the optical sensor configurable to sensing the infrared light from the infrared light source, wherein the receptacle is a brochure box and the stored removable content is a brochure, wherein the stored brochure reflects the infrared light upon the optical sensor, wherein removal of the stored brochure results in the infrared light not being sensed by the optical sensor, and wherein the sensor node is configurable to transmit a signal containing the unique identifier to the remote device upon the optical sensor not sensing the infrared light.

2. A device for remotely monitoring removable content of an apparatus, the device comprising:
   an application server having a processor, memory, and a network communications interface; and
   a software application, the software application operating using the application server, the software application configurable to receive a signal transmitted from the apparatus, the apparatus comprising
   a receptacle, the receptacle configurable to storing removable content;
   a sensor node, the sensor node disposed proximate to the receptacle, the sensor node including an optical sensor, the sensor node associated with a unique identifier; and
   an infrared light source, the infrared light source being disposed proximate to the sensor node, the infrared light source being configurable to transmit infrared light upon the sensor node, the sensor node being configurable to transmit the signal containing the unique identifier to the software application upon the optical sensor sensing the presence or absence of the infrared light, the signal being any of a cellular, satellite, and wireless network signal, wherein, upon receiving the signal, the software application notifies an entity, having an account on the software application, associated with the unique identifier that the sensor node transmitted the signal, wherein, the signal is related to the presence or absence of the removable content.

3. The apparatus of claim 2, wherein to conserve energy the infrared light source and the sensor node only periodically transmit and sense for infrared light, respectively.

4. The apparatus of claim 3, wherein a frequency of transmission and sensing of infrared light is adjustable.

5. The apparatus of claim 2, further comprising:
   a solar panel, the solar panel being disposed proximate to the receptacle, the solar panel configurable to supplying energy for the sensor node and the infrared light source.

6. The apparatus of claim 2, further comprising:
   an RFID tag, the RFID tag being coupled to the sensor node, the RFID tag providing an identification for the sensor node.

7. The apparatus of claim 2, further comprising:
   a GPS tracking device, the GPS tracking device being coupled to the sensor node to sense whether a geographic location of the sensor node has changed to a new geographic location, the geographic location begin transmittable to a remote device.

8. The apparatus of claim 2, further comprising:
   a voice system, the voice system being disposed proximate to the receptacle, the voice system configurable to emit audible sounds in response to any of removal of the stored content and the presence of an individual.

9. The apparatus of claim 2, wherein the receptacle is any of a mail box, a drop box, and a vending machine and the removable content is any of a document, mail, package, and object.

10. The apparatus of claim 9, wherein absence of stored removable content results in the infrared light being sensed by the optical sensor, wherein stored removable content blocks the infrared light from being sensed by the optical sensor, and wherein the sensor node is configurable to transmit a signal containing the unique identifier to a remote device upon the infrared light not being sensed by the optical sensor.

11. The apparatus of claim 2, wherein the sensor node includes an ambient light sensor, the ambient light sensor configurable to sensing ambient light.

12. The apparatus of claim 11, wherein the stored removable content decreases the level of ambient light sensed by the ambient light sensor, wherein removal of the stored removable content increases the level of ambient light sensed by the ambient light sensor, and wherein the sensor node is configurable to transmit a signal containing the unique identifier to a remote device upon the level of ambient light sensed being greater than a predetermined threshold level.

13. The apparatus of claim 2, wherein the sensor node includes a weight sensor, the weight sensor configurable to sensing the weight of stored content.

14. The apparatus of claim 13, wherein the stored removable content increases the weight sensed by the weight sensor, wherein removal of the stored removable content decreases the weight sensed by the weight sensor, and wherein the sensor node is configurable to transmit a signal containing the unique identifier to a remote device upon the weight being less than a predetermined threshold level.

15. The apparatus of claim 13, wherein removal of the stored removable content decreases the weight sensed by the weight sensor, and wherein the sensor node is configurable to transmit a signal containing the unique identifier to a remote device based upon the weight sensed by the weight sensor.

16. The apparatus of claim 2, wherein the sensor node includes an input device, the input device being any of a mechanical button, electromechanical button, motion sensor, a proximity sensor, a touch sensor, and a microphone, the sensor node being configurable to transmit a signal to a remote device upon activation of the input device.

17. The device of claim 2, wherein the software application provides statistics relating to a rate of removable of content from the apparatus.

\* \* \* \* \*